(12) United States Patent
Busch et al.

(10) Patent No.: US 7,012,800 B2
(45) Date of Patent: Mar. 14, 2006

(54) SWITCHGEAR UNIT FOR A CONSUMER, ESPECIALLY A MOTOR STARTER

(75) Inventors: Klaus Busch, Amberg (DE); Manuela Forster, Wolfsbach (DE); Michael Freimuth, Hirschau (DE)

(73) Assignee: Siemens Aktiengesellschaft, Munich (DE)

( * ) Notice: Subject to any disclaimer, the term of this patent is extended or adjusted under 35 U.S.C. 154(b) by 168 days.

(21) Appl. No.: 10/475,342

(22) PCT Filed: Apr. 8, 2002

(86) PCT No.: PCT/DE02/01282

§ 371 (c)(1),
(2), (4) Date: Oct. 20, 2003

(87) PCT Pub. No.: WO02/086929

PCT Pub. Date: Oct. 31, 2002

(65) Prior Publication Data

US 2004/0246661 A1 Dec. 9, 2004

(30) Foreign Application Priority Data

Apr. 20, 2001 (DE) ................................. 101 19 458

(51) Int. Cl.
*H02B 5/00* (2006.01)

(52) U.S. Cl. .................. 361/605; 361/614; 361/628; 361/673

(58) Field of Classification Search ............... 361/605, 361/620–624, 626, 631, 634–636, 640–643; 200/50.27

See application file for complete search history.

(56) References Cited

U.S. PATENT DOCUMENTS

| 4,250,343 | A |   | 2/1981  | Kaufhold et al. |
|-----------|---|---|---------|-----------------|
| 4,258,343 | A |   | 3/1981  | Kussy |
| 5,715,129 | A | * | 2/1998  | Innes ................... 361/93.2 |
| 5,870,277 | A | * | 2/1999  | Girard et al. ........... 361/627 |
| 5,870,278 | A | * | 2/1999  | Girard et al. ........... 361/627 |
| 5,978,193 | A | * | 11/1999 | Kaaden .................. 361/64 |
| 6,147,419 | A | * | 11/2000 | Girard .................. 307/116 |
| 6,411,500 | B1| * | 6/2002  | Kaaden et al. ......... 361/614 |

FOREIGN PATENT DOCUMENTS

| DE | 43 35 965 A1 | 4/1995 |
| EP | 0 343 390 A2 | 11/1989 |
| FR | 2.003.575    | 11/1969 |
| WO | WO 99/23737  | 5/1999 |
| WO | WO 01/88939 A1 | 11/2001 |

* cited by examiner

Primary Examiner—Boris Chervinsky
(74) Attorney, Agent, or Firm—Harness, Dickey & Pierce, P.L.C.

(57) ABSTRACT

The Switchgear unit, especially a motor starter, has a contactor and a power switch for short-circuit protection. The additional function of overload protection envisaged for the switchgear unit is integrated in an overload relay that is configured separately from the power switch. The components thereof extend into free areas formed by the arrangement of the contactor and power switch as standard components on a support.

24 Claims, 1 Drawing Sheet

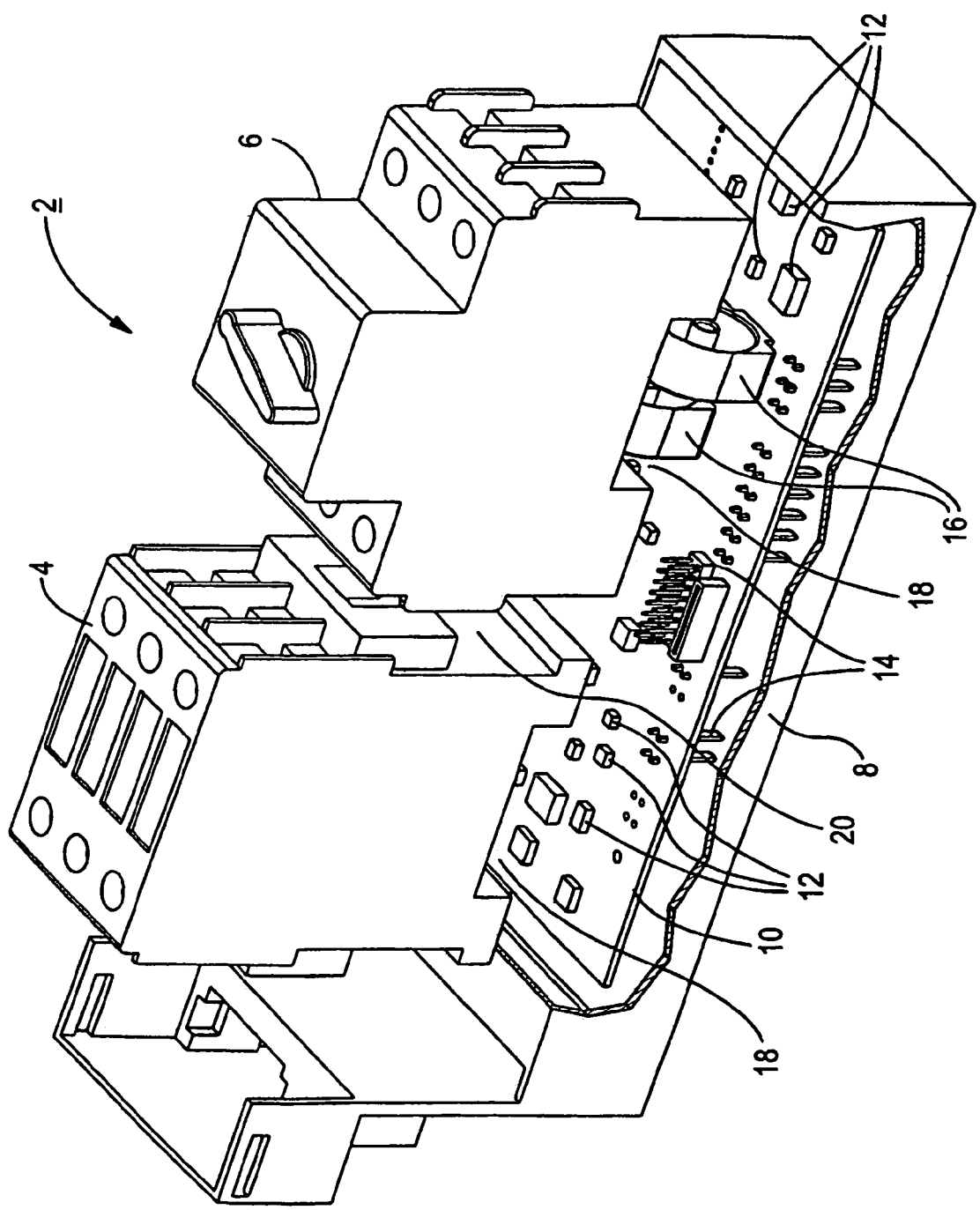

SWITCHGEAR UNIT FOR A CONSUMER, ESPECIALLY A MOTOR STARTER

This application is the national phase under 35 U.S.C. § 371 of PCT International Application No. PCT/DE02/01282 which has an International filing date of Apr. 8, 2002, which designated the United States of America and which claims priority on German Patent Application number DE 101 19 458.7 filed Apr. 20, 2001, the entire contents of which are hereby incorporated herein by reference.

FIELD OF THE INVENTION

The present invention generally relates to a switchgear unit for a load, in particular a motor starter, having a switching unit for switching the load during operation, and having the functions of short circuit protection and overload protection.

BACKGROUND OF THE INVENTION

A switchgear unit is generally also referred to as a load feeder and is usually arranged in a switchgear cabinet on a standardized top-hat rail next to other load feeders. The load feeders arranged in a switchgear cabinet are assembled in a modular fashion in order to make it possible to meet the respective requirements. Load feeders of this type are provided in particular in industrial systems for controlling and switching high currents and voltages. The switchgear unit is used in particular to drive a three-phase motor. The switchgear unit is in this case also referred to as a motor starter.

The switchgear unit of a motor starter generally has three functions for protecting the motor. The first function is that of switching the motor during operation, and is performed by a dedicated standard unit, usually a so-called contactor. The contactor is designed to repeatedly switch high currents on and off, during operation. Furthermore, in a switchgear unit, the functions of short circuit protection and overload protection are integrated in a standard unit referred to as a power breaker. The power breaker isolates the load from the power supply system when a short circuit occurs and also when the current is too high. The two standard units are arranged next to one another on a common carrier and form the switchgear unit.

DE 43 35 965 discloses a motor starter having integrated short circuit protection and in which a power breaker, an electronic tripping unit and a contactor are arranged one behind the other. The electronic tripping unit is integrated together with the power breaker in a common enclosure. The tripping unit in this case has a release which provides the thermal overload protection for the motor.

FR 2 003 575 discloses a contactor having a short circuit release which is provided as an attachment and having an attachment which contains a thermal overcurrent release.

WO 99/23737 discloses a switchgear unit which has a contactor and a power breaker, each as separate units. These units are arranged on a subcarrier in which a printed circuit board with electronics is integrated. Such electronics make it possible to drive the switchgear unit by way of a bus system. In this case, in particular two bus systems are provided, that is a data bus for interchanging signals and a power bus for supplying power. As an alternative to the standard units of the contactor and the power breaker, an electronic circuit is proposed which is, however, less suitable for switching very high currents than the electromechanical units of the contactor and the power breaker, or is very complex and expensive.

SUMMARY OF THE INVENTION

An object of the present invention is to specify a cost-effective switchgear unit where design is as simple as possible.

An object of the present invention is achieved by providing a switchgear unit, in particular for a motor starter, having the functions of switching, short circuit protection and overload protection during operation, provision is made for each of these functions to be performed in a separate functional unit. The switching operation is in this case may be performed by a switching unit, in particular a contactor. The function of short circuit protection may be performed by a power breaker, and the function of overload protection may be performed by an overload relay which is separate from the power breaker.

The functions of overload protection and short circuit protection are usually integrated in a conventional power breaker. In order to ensure that the functions of short circuit protection and overload protection are reliably performed, the power breaker must be specifically designed for the switching current envisaged in each case. Switching current is regarded here as the current for which the switchgear unit is designed. This means that, for example, for the switching current range between 0 and 25 A, approximately twenty separate, differently designed power breakers are required. This results in considerable cost and requires significant care to be taken when selecting the appropriate power breaker.

By separating the functions of short circuit protection and overload protection, the switchgear unit may be considerably simplified. In particular, the function of overload protection no longer needs to be integrated in the power breaker, which can primarily be designed for the function of short circuit protection. The power breaker as a result has a much simpler design and is thus more cost-effective, and can also be used over a broad current range. The function of overload protection performed in the overload relay is also comparatively simple as a result of it being separate from the short circuit protection.

The overload relay may be in the form of an electronic overload relay which has, in particular, a current transformer. This current transformer is arranged around a conductor to be monitored in the manner of a current measuring coil, and detects the magnetic field induced by the conductor through which current is flowing. An electronic evaluation unit connected to the current transformer determines from this the current flowing through the conductor. Based on this principle, the electronic overload relay can be used for a very broad current range. The electronics determine the current level above which the overload relay will trip, and this current level can be almost any desired value.

In order to allow for a switchgear unit design which is as cost-effective and compact as possible, the switching unit and the power breaker may be designed as standard components which are arranged on a carrier so as to form a free space. At least one component of the overload relay extends into this free space. This makes it possible to keep the physical space required for the switchgear unit small, which means that there is a small space requirement in the switching cabinet and the installation costs are low.

Of particular advantage for cost-effective design is the use of standard units for the switching unit (contactor) and the power breaker. Such standard units usually have a cutout underneath for mounting them on a top-hat rail, and this cutout forms a free space in which the component preferably engages. In addition, an interspace is usually provided between the contactor and the power breaker and likewise advantageously acts as a free space for arranging a component of the overload relay.

In an expedient manner, in this case, the current transformer in particular extends into the free space, since it takes up the most physical space owing to its coil structure. A dedicated current transformer is provided in the overload relay for each phase of the power supply system. These current transformers are thus arranged such that they are distributed, for example, in the two cutouts or in the interspace.

In an expedient manner, for a compact arrangement, the component, which extends into the free spaces, is arranged on the carrier on which the contactor and the power breaker are also mounted.

In a particularly expedient refinement, provision is made for the components of the overload relay to be arranged on a printed circuit board on the carrier. The printed circuit board is preferably at the same time fitted with bus electronics so that the switchgear unit is designed for connection to a bus system. By integrating the electronic overload relay on the printed circuit board, the space requirement is minimized in a particularly efficient manner, and the production costs are kept low. This is because the printed circuit board which is usually used for bus electronics nowadays needs only a few additional electronic functions for modern switchgear units. Owing to the high degree of automation in the production of printed circuit boards, this requires only a little additional complexity. However, considerable savings can be made since, on the one hand, the power breaker can be designed in a simplified fashion without the function of overload protection, and can be used in the standard way for a broad current range. At the same time, on the other hand, by integrating the electronic overload relay on the printed circuit board with the current transformers extending into the free spaces, a very small physical volume is achieved which also keeps the costs of installing the switchgear unit low.

Further scope of applicability of the present invention will become apparent from the detailed description given hereinafter. However, it should be understood that the detailed description and specific examples, while indicating exemplary embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawing which IS given by way of illustration only, and thus are not limitative of the present invention, and wherein:

The single FIGURE illustrates a simplified schematic and perspective illustration of a switchgear unit.

DETAILED DESCRIPTION OF THE EXEMPLARY EMBODIMENTS

The switchgear unit 2 has a contactor 4, in the form of a standard unit, as a switching unit for the function of switching during operation. Furthermore, a power breaker 6 is likewise provided as a standard unit for the function of short circuit protection. The contactor 4 and the power breaker 6 intended to be arranged on an approximately L-shaped carrier 8. The carrier 8 is usually intended to be snapped or pushed onto a top-hat rail in a switchgear cabinet.

A printed circuit board 10 is integrated in the base of the carrier 8 and is fitted with a number of electronic components 12 and contact-making devices 14. In particular, bus electronics are integrated on the printed circuit board 10 such that the switchgear unit 2 can be connected to a bus system. This bus system is, for example, a signal bus for transmitting signals and/or a power bus for supplying power to the switchgear unit 2.

The present invention also provides for the function of overload protection to be performed separately from the power breaker 6. For this purpose, the function of overload protection is performed by an electronic overload relay which has, in particular, a current transformer 16 for each phase conductor of the power supply system. Associated with the electronic overload relay are, furthermore, some of the components 12 arranged on the printed circuit board 10. The current transformer 16 is in the form of a current measuring coil and serves the purpose of detecting the magnetic field induced by the phase conductor through which current is flowing. The respective current levels are determined from the signals from the current transformer 16 by means of the components 12.

Owing to the use of standard units for the contactor 4 and the power breaker 6, they each have a cutout 18 underneath for arranging them on a top-hat rail. When the contactor 4 and the power breakers 6 are arranged on the carrier 8, the configuration results in an interspace 20 being formed between these units. The cutouts 18 and the interspace 20 form free spaces by virtue of this configuration.

In order to make expedient use of these free spaces that are present, the current transformers 16 extend into these free spaces. In the exemplary embodiment, two current transformers 16 are shown which extend into the cutout 18 in the power breaker 6. As an alternative to this, the current transformers can also be arranged distributed over the two cutouts 18 and the interspace 20, or arranged exclusively in the interspace 20 or exclusively in the cutout 18 in the contactor 4.

Owing to the use of the free spaces formed by virtue of the configuration, the space requirement for the switchgear unit 2 is kept very small, overall. This achieves a compact physical volume and keeps the space requirement in the switchgear cabinet small, and thus the installation costs low. In addition, simplification of the power breaker is made possible by integrating the function of overload protection in a unit which is separate from the power breaker 6, the electronic overload relay.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A switchgear unit, comprising:
    a switching unit for switching a load during operation thereof, the switching unit including short circuit protection and overload protection functionality, the function of short circuit protection being integrated in a power breaker, and the function of overload protection being integrated in a separate functional unit in an electronic overload relay which is separate from the power breaker, wherein the switching unit and the power breaker are arranged on a carrier so as to form a free space, at least one of components of the overload relay extending into the free space.

2. The switchgear unit as claimed in claim 1, wherein the overload relay is in the form of an electronic overload relay.

3. The switchgear unit as claimed in claim 1, wherein the power breaker and the switching unit each have a cutout on an underside thereof, the cutouts being for mounting the power breaker and the switching unit on a top-hat rail, and the component being capable of engaging at least one of the cutouts.

4. The switchgear unit as claimed in claim 1, wherein the power breaker and the switching unit are arranged next to one another so as to form an interspace, the interspace capable of accommodating the component or a plurality of components.

5. The switchgear unit as claimed in claim 1, wherein the overload relay has a current transformer which extends into the free space.

6. The switchgear unit claimed in claim 1, wherein a component of the overload relay is arranged on the carrier.

7. The switchgear unit as claimed in claim 1, wherein components of the overload relay are arranged on a printed circuit board on the carrier.

8. The switchgear unit as claimed in claim 7, wherein the printed circuit board is fitted with an electronic bus system.

9. The switchgear unit as claimed in claim 3, wherein the power breaker and the switching unit are arranged next to one another so as to form an interspace, the interspace capable of accommodating the component or a plurality of components.

10. The switchgear unit as claimed in claim 3, wherein the overload relay has a current transformer which extends into the free space.

11. The switchgear unit as claimed in claim 4, wherein the overload relay has a current transformer which extends into the free space.

12. The switchgear unit claimed in claim 3, wherein a component of the overload relay is arranged on the carrier.

13. The switchgear unit claimed in claim 4, wherein a component of the overload relay is arranged on the carrier.

14. The switchgear unit claimed in claim 5, wherein a component of the overload relay is arranged on the carrier.

15. The switchgear unit as claimed in claim 3, wherein the components of the overload relay are arranged on a printed circuit board on the carrier.

16. The switchgear unit as claimed in claim 4, wherein the components of the overload relay are arranged on a printed circuit board on the carrier.

17. The switchgear unit as claimed in claim 5, wherein the components of the overload relay are arranged on a printed circuit board on the carrier.

18. The switchgear unit as claimed in claim 6, wherein the components of the overload relay are arranged on a printed circuit board on the carrier.

19. A switchgear unit, comprising:

a switching unit for switching a load during operation thereof, the switching unit including short circuit protection and overload protection functionality, the function of short circuit protection being integrated in a power breaker, and the function of overload protection being integrated in a separate functional unit in an electronic overload relay which is separate from the power breaker, wherein the load is a motor starter.

20. The switchgear unit as claimed in claim 19, wherein the power breaker and the switching unit each have a cutout on an underside thereof, the cutouts being for mounting the power breaker and the switching unit on a top-hat rail, and the component being capable of engaging at least one of the cutouts.

21. An apparatus, comprising:

a mountable power breaker having integrated short circuit protection functionality; and overload protection circuitry being functionally separate from the power breaker, the overload protection circuitry being position in a free space defined at least in part by the power breaker.

22. The apparatus according to claim 21, wherein the over load protection circuitry includes at least an electronic overload relay.

23. The apparatus according to claim 21, wherein the free space defined at least in part by the power breaker is defined by an underside thereof.

24. The apparatus according to claim 21, wherein the power breaker is mounted on a carrier, the power breaker and carrier combination thereby defining a switchgear unit.

* * * * *